United States Patent
Weinstein et al.

(10) Patent No.: US 6,514,545 B1
(45) Date of Patent: *Feb. 4, 2003

(54) ASSEMBLAGE OF NUTRIENT BEVERAGES AND REGIMEN FOR ENHANCING CONVENIENCE, INSTRUCTION, AND COMPLIANCE WITH EXERCISE SUPPLEMENTATION

(76) Inventors: Robert E. Weinstein, 177 Commonwealth Ave., Boston, MA (US) 02115; Allan M. Weinstein, 9205 Pegasus Ct., Potomac, MD (US) 20854; David Schmier, 1822 Pandora Ave., #3, Los Angeles, CA (US) 90025

( * ) Notice: Subject to any disclaimer, the term of this patent is extended or adjusted under 35 U.S.C. 154(b) by 182 days.

This patent is subject to a terminal disclaimer.

(21) Appl. No.: 09/769,984

(22) Filed: Jan. 25, 2001

Related U.S. Application Data

(63) Continuation-in-part of application No. 09/429,872, filed on Oct. 29, 1999, now Pat. No. 6,214,390, which is a continuation-in-part of application No. 08/997,406, filed on Dec. 23, 1997, now Pat. No. 6,013,290, which is a continuation-in-part of application No. 08/971,302, filed on Nov. 17, 1997, now abandoned.

(51) Int. Cl.⁷ ............................. A23L 2/00; A23L 2/52
(52) U.S. Cl. ............................. 426/87; 426/2; 426/74; 426/108; 426/120; 426/590; 426/656; 426/658; 426/810
(58) Field of Search ............................. 426/2, 74, 108, 426/120, 590, 656, 810, 658, 87

(56) References Cited

U.S. PATENT DOCUMENTS

| | | |
|---|---|---|
| 5,236,712 A | 8/1993 | Fregly et al. |
| 5,403,921 A | 4/1995 | Montner et al. |
| 5,587,190 A | 12/1996 | Guezennec et al. |
| 5,780,094 A | 7/1998 | King |
| 5,817,364 A | 10/1998 | Olin |
| 6,013,290 A * | 1/2000 | Weinstein et al. .......... 424/439 |
| 6,214,390 B1 * | 4/2001 | Weinstein et al. .......... 426/108 |

FOREIGN PATENT DOCUMENTS

WO PCT/US86/01675 2/1988

OTHER PUBLICATIONS

J.L. Ivy, Glycogen Resynthesis After Exercise: Effect of Carbohydrate Iintake, 19 Intl J. Sports Medicine 142–5 (1998).

B.B. Yaspelkis III and J.L. Ivy, The Effect of a Carbohydrate–Argine Supplement on Postexercise Carbohydrate Metabolism, 9 Intl. J. Sports Nutrition 241–50 (Sep. 1999).

K.M. Zawadzki et al., Carbohydrate–Protein Complex Increases the Rate of Muscle Glycogen Storage After Exercise, 72 (5) J. Applied Physiology 1854–9 (May 1992).

B.J. Lyle et al., Hydration and Fluid Replacement, in Sports Nutrition for the 90s, 175 (J.R. Benning et al. eds, 1991).

J.E. Greenleaf, Problem: Thirst, Drinking Behavior, and Involutary Dehydration, 24 Med. Sci. Sports Exercise 645 (1991).

J.L. Ivy et al., Muscle Glycogen Synthesis After Exercise: Effect of Time of Carbohydrate Ingestion, 64 J. Applied Physiology 1480 (1998).

* cited by examiner

Primary Examiner—Helen Pratt
(74) Attorney, Agent, or Firm—Morse, Altman & Martin

(57) ABSTRACT

A device and method for use in conjunction with exercise of about one hour or less which enhances convenience, and encourages compliance with a regimen of exercise beverages to accomplish preexercise hydration and postexercise hydration and muscle glycogen replenishment, and which includes a preexercise beverage formulation and a postexercise beverage formulation combined in a unified package with indicia and instructions. The preexercise beverage has a volume of from about 240 ml to about 300 ml, and the postexercise beverage has a volume of from about 300 ml to about 600 ml.

6 Claims, 1 Drawing Sheet

ASSEMBLAGE OF NUTRIENT BEVERAGES AND REGIMEN FOR ENHANCING CONVENIENCE, INSTRUCTION, AND COMPLIANCE WITH EXERCISE SUPPLEMENTATION

CROSS-REFERENCES TO RELATED APPLICATIONS

The present application is a continuation-in-part application of application Ser. No. 09/429,872, dated Oct. 29, 1999 for ASSEMBLAGE OF NUTRIENT BEVERAGES AND REGIMEN FOR ENHANCING CONVENIENCE, INSTRUCTION, AND COMPLIANCE WITH EXERCISE SUPPLEMENTATION in the names of Robert E. Weinstein, Allan M. Weinstein, and David Schmier, now U.S. Pat. No. 6,214,390 which is a continuation-in-part of application Ser. No. 08/997,406, dated Dec. 23, 1997 for ASSEMBLAGE OF NUTRIENT BEVERAGES AND REGIMEN FOR ENHANCING CONVENIENCE, INSTRUCTION, AND COMPLIANCE WITH EXERCISE SUPPLEMENTATION in the names of Robert E. Weinstein, Allan M. Weinstein, and David Schmier, now U.S. Pat. No. 6,013,290, which is a continuation-in-part of application Ser. No. 08/971,302, dated Nov. 17, 1997 for ASSEMBLAGE OF NUTRIENT BEVERAGES AND REGIMEN FOR USE IN CONJUNCTION WITH EXERCISE in the names of Robert E. Weinstein, Allan M. Weinstein, and David Schmier, now abandoned.

STATEMENT REGARDING FEDERALLY SPONSORED RESEARCH OR DEVELOPMENT

Not Applicable.

BACKGROUND OF THE INVENTION

1. Field of the Invention

The present invention relates to physical fitness, more particularly, to nutrient beverage formulations for consumption before and after a physical exercise session.

2. Description of the Related Art

It is well known that the availability of water is critical to the maintenance of plasma volume and regulation of body temperature during exercise, and that carbohydrate availability is necessary for the maintenance of muscle glycogen, the major source of energy for working skeletal muscle. The failure to attended to these requirements of exercise may result in negative effects on performance or detrimental effects on health.

While it is known that the fluids and nutrients that are lost during exercise must be replenished, it is generally assumed that instinctive responses, such as hunger and thirst, are sufficient to prompt an individual to ingest the appropriate fluids and nutrients at appropriate times and in appropriate amount to fulfill the needs of exercise. However, this is not the case. Surveys have disclosed that knowledge of fluid requirements is lacking, even among serious athletes. Moreover, it has been shown that thirst is unreliable for determining how much fluids to drink, or when to drink them. Blunted thirst sensation is known to occur with exercise, and thirst can be quenched before the body completely rehydrates. Fluid losses can accumulate over several days of exercise to produce a state of hypohydration.

While contingent upon the intensity of exercise and the environment in which the exercise is performed, about one liter of water per hour is typically lost in sweat during average exercise, and it is advisable for individuals to deliberately replace such fluids. This is preferably accomplished by both anticipating fluid loss prior to exercise and replacing fluids lost after exercise.

Glucose derived from storage in muscle as glycogen is established to be the major fuel for most types of exercise, and it is advantageous to promote muscle glycogen storage. Carbohydrate replacement soon after exercise has been found to facilitate recovery of muscle glycogen after exercise, and delay of carbohydrate consumption for even two hours after exercise can reduce the rate of recovery by 50%.

U.S. Pat. No. 6,013,290, application Ser. No. 08/997,406, incorporated herein by reference, points out that single beverage formulations alone fail to accomplish preexercise hydration, rehydration after exercise, and postexercise replenishment of muscle glycogen, and discloses the use of a packaged regimen of preformulated beverages to teach users, enhance convenience, and encourage compliance with these objectives. U.S. Pat. No. 6,013,290 discloses the use of dilute carbohydrate beverages for before exercise and beverages with carbohydrate concentration of greater than about 20% for after exercise. Application Ser. No. 09/429,872 discloses postexercise formulations having a concentration of carbohydrate of greater than about 13% to enhance postexercise muscle glycogen recovery, in accordance with research published subsequent to the Dec. 23, 1997 filing date of U.S. Pat. No. 6,013,290. Not disclosed, however, are formulations for exercise conditions in which the volume of fluid loss is anticipated to be relatively low, such as with exercise of moderate, rather than great, intensity, or exercise performed in environments favorable to fluid conservation.

BRIEF SUMMARY OF THE INVENTION

An object of the present invention is to provide a person with a combination of nutrient beverage formulations and a regimen for their use prior to and after an exercise session lasting approximately one hour or less.

Another object is to provide a person with a combination of nutrient beverage formulations formulated to enhance performance during an exercise session and to reduce the detrimental physiological effects of the exercise after the session.

Yet another object is to provide a person with a combination of nutrient beverage formulations preformulated to work together in an optimal fashion by application of scientifically-derived data.

A further object is to provide a person with a combination of nutrient beverage formulations that is convenient and simple to use.

The present invention includes a regimen that comprises two different formulations containing fluids and nutrients and a program for use of the formulations before and after an exercise session. Each formulation is designed for the needs of a different phase of exercise and for compatibility with each other, something that is outside of the expertise of an ordinary user.

The present invention teaches a method and device for instructing a user, enhancing convenience, and encouraging compliance with exercise supplementation, which employs a hydrating preexercise beverage, a hydrating and muscle glycogen replenishing postexercise beverage, and indicia and instructions for coordinating the use of such a regimen. The preexercise beverage has a carbohydrate concentration of not more than about 9%, and the postexercise beverage has a carbohydrate concentration of at least about 13%.

An important object of the present invention is to provide a user with formulations for exercise conditions in which volume of fluid loss is relatively low, such as with exercise of moderate, rather than great, intensity, or exercise performed in environments favorable to fluid conservation, incorporating a preexercise beverage having a volume of about 240–300 milliliters (ml) and a postexercise beverage having a volume of about 300–600 ml.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawing, wherein.

DETAILED DESCRIPTION OF THE INVENTION

Figure 1:
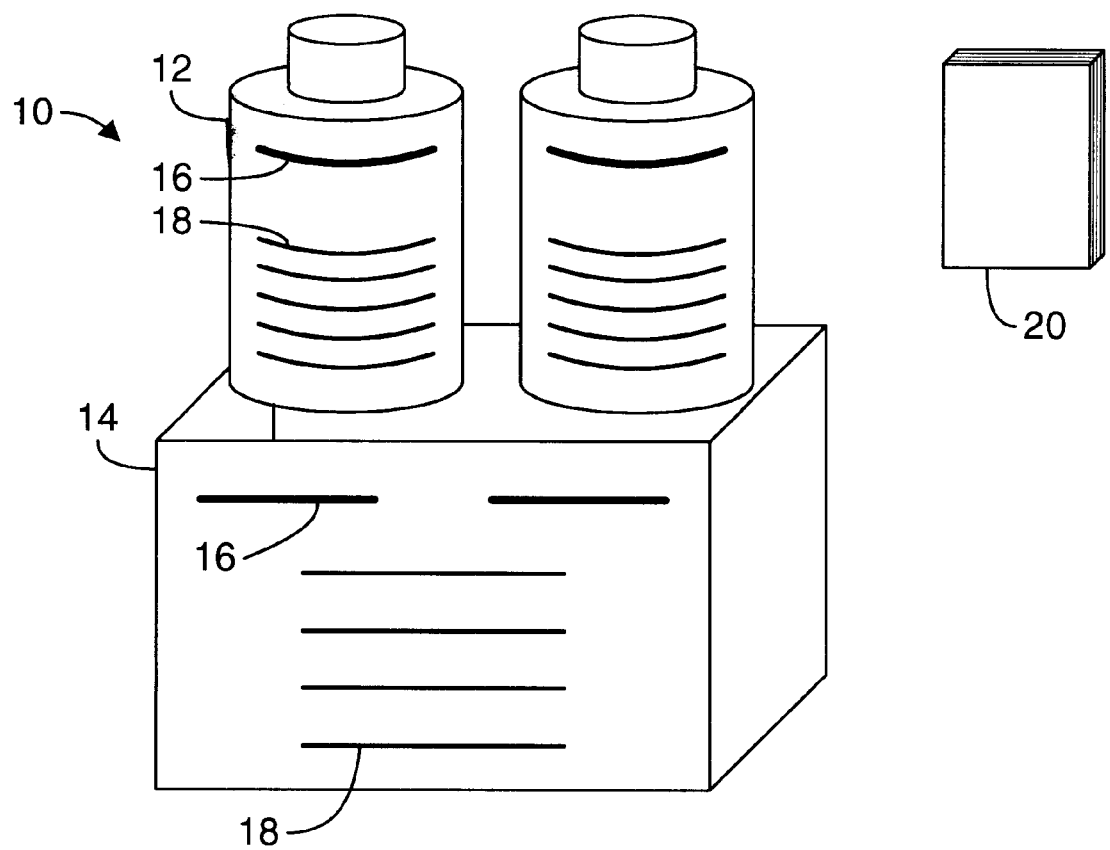
FIG. 1 shows an example embodiment of the present invention.

A detailed description of the packaging of the present invention is described in U.S. Pat. No. 6,013,290, application Ser. No. 08/997,406. In summary, the preferred embodiment 10 provides formulations in discrete containers of fully-constituted liquid so that they may be drunk directly. The formulations are combined together in a unified package 14 with indicia 16 for identification of the different formulations and instructions 18 for their use.

Heat is produced during exercise as a result of the conversion of chemical energy into mechanical energy. The body maintains temperature homeostatis by means of a thermoregulatory system in which blood flow is increased to the skin for heat transfer into the immediate environment by convection, radiation, and evaporation. Exercise in cooler environments enhances heat transfer by convection and radiation which decreases the need for evaporation of sweat and conserves fluid loss. Humidity also affects the body's ability to dissipate heat. As humidity increases, the rate at which sweat evaporates decreases, such that more sweat drips off the body without transferring heat from the body to the environment. About one liter of water per hour is typically lost in sweat during average exercise, and this varies by both the intensity of the exercise and the temperature and humidity of exercise conditions.

The principle objective of prehydration exercise beverages is to provide a reservoir of fluid in anticipation of fluid losses. U.S. Pat. No. 6,013,290 and application Ser. No. 09/429,872 claim preexercise beverages having a volume of water of from about 300 ml to about 600 ml and postexercise beverages having a volume of water from about 300 ml to about 600 ml. The present invention contemplates the sufficiency of a preexercise beverage having a volume of water of from about 240 ml to about 300 ml for exercising at a lesser intensity or in an environment which favors conservation of fluid. Exercise regimens of the present invention would range from a minimal total volume of 240 ml in the preexercise beverage and 300 ml in the postexercise beverage, for a total of 540 ml, to a maximum total volume of 300 ml in the preexercise beverage and 600 ml in the postexercise beverage, for a total of 900 ml.

The following are examples of beverage regimens which might be formulated to accomplish preexercise and postexercise hydration and postexercise muscle glycogen replenishment. These examples are meant to be illustrative and are not intended to be exhaustive.

EXAMPLE I

Preexercise: 12 grams of carbohydrate and 240 ml of water (5.0% carbohydrate solution) for consumption approximately 10–20 minutes prior to exercise.

Postexercise: 60 grams of carbohydrate and 420 ml of water (14.3% carbohydrate solution) for consumption shortly following exercise.

This regimen is particularly suitable for an individual weighing about 60 Kg (132 lb.). The principal objective of the preexercise beverage is prehydration by providing a small "reservoir" of fluid in the gastrointestinal lumen which will be absorbed during exercise. The 240 ml volume of the preexercise beverage example anticipates exercise of moderate, rather then intense, degree, and/or exercise in a cooler or drier environment that favors fluid conservation during exercise. The total volume of fluid replacement of 660 ml of water is less than the approximately one liter of water typically lost in sweat during average exercise. It is, however, commensurate with anticipated fluid loss before exercise and fluid replacement after exercise for such an individual performing exercise at a moderate intensity in a cool, dry environment.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An exercise beverage kit comprising:
   (a) a first beverage having a volume of water of from about 240 milliliters to about 300 milliliters and a concentration of carbohydrate of about 9% or less;
   (b) a second beverage having a volume of water of from about 300 milliliters to about 600 milliliters and a concentration of carbohydrate of greater than about 13%;
   (c) indicia to distinguish said first beverage and said second beverage;
   (d) instructions teaching the use of said first beverage and said second beverage as a regimen in association with exercise having a duration of about one hour or less, such that said first beverage is instructed for ingestion prior to said exercise and said second beverage is instructed for ingestion directly following said exercise; and
   (e) packaging unifying said first beverage, said second beverage, indicia, and instructions.

2. The kit of claim 1 wherein said second beverage additionally contains arginine.

3. A method for preparing an exercise hydration and muscle glycogen replenishment kit comprising the steps of:
   (a) formulating a first beverage to have a volume of water of from about 240 milliliters to about 300 milliliters, and a concentration of carbohydrate of less than about 9%;
   (b) formulating a second beverage to have a volume of water of from about 300 milliliters to about 600 milliliters, and a concentration of carbohydrate of greater than about 13%;
   (c) devising indicia to distinguish said first beverage and said second beverage;
   (d) devising instructions to teach the use of said first beverage and said second beverage as a regimen in association with exercise of duration of about one hour or less, such that said first beverage is instructed for ingestion prior to said exercise, and said second beverage is instructed for ingestion directly following said exercise; and (e) providing said first beverage, second beverage, indicia, and instructions in a unified package for a user.

4. The method of claim 3 wherein said second beverage additionally contains arginine.

5. A method for exercise hydration and muscle glycogen replenishment method comprising the steps of:
(a) obtaining an exercise beverage kit comprising a first beverage having a volume of water of from about 240 milliliters to about 300 milliliters and a concentration of carbohydrate of less than about 9%, a second beverage having a volume of water of from about 300 milliliters to about 600 milliliters and a concentration of carbohydrate of greater than about 13%, indicia to distinguish said first beverage and said second beverage, instructions teaching the use of said first beverage and said second beverage as a regimen in association with exercise of about one hour or less, and packaging unifying said first beverage, said second beverage, indicia, and instructions;
(b) using said indicia to distinguish said first beverage, said second beverage;
(c) drinking said first exercise beverage prior to said exercise in accordance with said instructions; and
(d) drinking said second exercise beverage directly following said exercise in accordance with said instructions.

6. The method of claim 5 wherein said second beverage additionally contains arginine.

* * * * *